Aug. 18, 1936.  W. A. RIDDELL  2,051,225

PHOTOGRAPHIC SHUTTER

Filed Dec. 12, 1935

William A. Riddell,
INVENTOR.

BY
ATTORNEYS.

Patented Aug. 18, 1936

2,051,225

UNITED STATES PATENT OFFICE 2,051,225

PHOTOGRAPHIC SHUTTER

William A. Riddell, Rochester, N. Y., assignor to Eastman Kodak Company, Rochester, N. Y., a corporation of New York Application December 12, 1935, Serial No. 54,107

6 Claims. (Cl. 95—60)

This invention relates to photography, and more particularly to shutters for photographic cameras. One object of my invention is to provide a simple type of shutter with a retarding means for producing an exposure which is sufficiently slow to produce satisfactory results with an inexpensive, small aperture lens. Another object of my invention is to provide a retarding device in the form of an escapement which contacts directly with the shutter blade. Other objects will appear from the following specification, the novel features being particularly pointed out in the claims at the end thereof.

In inexpensive camera shutters which are of small size it is quite difficult to obtain an instantaneous exposure which is sufficiently slow for small apertured lenses usually used with such shutters. It is comparatively simple to obtain an exposure of around 1/100 of a second with a simple type of shutter in which an apertured or slotted plate is revolved or oscillated upon its pivot under the impulse of a spring.

In constructing the shutter it is desirable to have a spring with somewhat more power than is actually required because a very light spring is difficult to control. However, where a spring of considerable power is used, the time which it takes the aperture in the shutter blade to pass the objective is so short that a full exposure is not obtained. It is the purpose of this invention to provide at small cost a retarding device by which a slow exposure—1/25 of a second, for instance—may be readily obtained even though a comparatively substantial spring is used for actuating the shutter.

This shutter may be of the type shown in Patent No. 1,991,146, Fuerst, February 12, 1935.

Coming now to the drawing wherein like reference characters denote like parts throughout—

Figure 1:
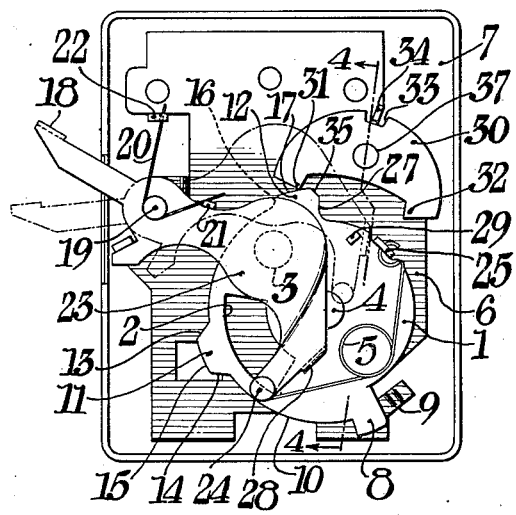
Fig. 1 is a plan view of a typical shutter having a retarding mechanism constructed in accordance with and embodying a preferred form of my invention.

By way of illustration I have shown a slow speed shutter of a simple type in which the shutter blade 1 is provided with an exposure aperture 2 which is adapted to swing across the lens aperture 3 when the shutter blade 1 is moved upon its pivot 4 by means of the hairpin spring 5.

The pivot 4 may be carried by a supporting plate 6 mounted in a shutter casing 7, the cover of which has been removed and which is not shown.

The shutter blade 1 is provided with a lug 8 adapted to hold the shutter blade in an initial position of rest through contact with the formed-up lug 9 of the shutter plate 6. The shutter plate may likewise have an arcuate periphery 10 from which a pair of lugs 11 and 12 extend outwardly, lug 11 preferably having two angularly disposed edges 13 and 14 leading to the arcuate edge 15, and lug 12 preferably having a single angularly disposed edge 16 leading to the arcuate surface 17. Surfaces 15 and 17 are preferably concentric, being equally spaced from the center of the pivot 4.

In order to move the shutter blade 1, the shutter is provided with a trigger 18 which is pivoted at 19 to the shutter plate 6 and which is normally held in the position shown in Fig. 1 by means of the spring 20 engaging the lugs 21 and 22 carried by the shutter plate 6, and by a portion 23 of the trigger which forms also a cover blind for the aperture 3, permitting the shutter blade after an exposure to return to its initial position while excluding light from the aperture 3. On the end of the cover blade 23 there is a stud 24 carrying one end of the hairpin spring 5, the other end of which engages a lug 25 on the shutter blade. Thus, when the trigger 18 is moved downwardly the hairpin spring 5 is compressed as the ends of the spring approach each other, and as the stud 24 passes the lug 25, the spring is suddenly released, causing the shutter blade to rotate until an edge 27 on the blade strikes the stop 9.

Figure 4:
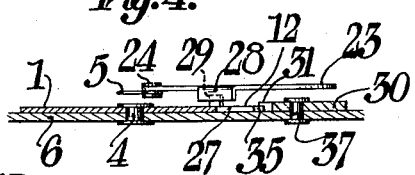
Fig. 4 is a fragmentary detail section on line 4—4 of Fig. 1.

In order to store up a certain amount of energy in spring 5 before it is released the cover blade 23 is provided with a downwardly extending lug 28 best shown in Fig. 4. As the trigger 18 is depressed, this lug moves into a position opposite a pin 29 carried by the shutter blade 1 so that the shutter is held against movement until the end of lug 28 slides entirely past the pin 29. In Fig. 1 I have shown in dot-and-dash lines the position of the trigger and shutter blade in which the lug 28 is entrapped. Slightly depressing the trigger from the position shown in dot-and-dash lines will release the lug 28.

It is necessary to slow down the movement of the shutter blade 1 to make a sufficiently slow exposure, but at the same time it is desirable to have the lens aperture 3 exposed to light rays before the movement of the shutter blade is retarded. To accomplish this I provide an escapement 30 having two arms 31 and 32 adapted to contact with the peripheries of the shutter blade 1, and having a limited movement relative to the supporting plate 6, permitted by the notch 33 in the escapement and the lug 34 bent up from the shutter plate.

Figure 2:
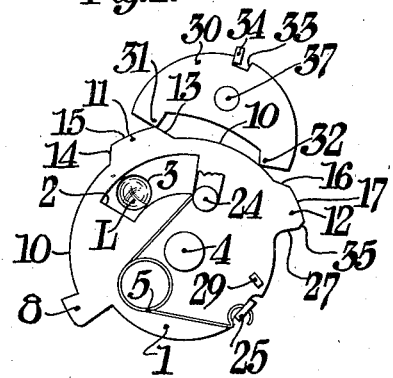
Fig. 2 is a fragmentary plan view of the shutter blade and retarding weight positioned just as the retarding action of the escapement comes into play.
Figure 3:
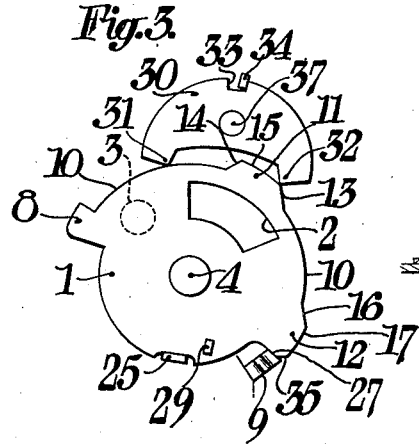
Fig. 3 is a similar view but showing the position of the parts as the retarding action of the escapement is completed.

In the position of rest one arm 31 may engage the periphery 17 of a lug on the shutter blade 1. As soon as the trigger 18 is depressed the shutter may move free from interference from the escapement until the edge 35 strikes arm 32 of the escapement, at which time the arm 31 may move down into engagement with the periphery 10. As indicated in Fig. 2 the lens L is exposed during the time that the escapement 30 is operative to slow down its movement. As soon as the exposure aperture 2 in the shutter blade 1 passes from the lens aperture 3 (as shown in Fig. 3), the escapement 30 is no longer effective, since the shutter may move without oscillating the escapement until the lug 27 strikes the stop 9.

Thus, the shutter blade 1 moves freely until the opening 2 lies opposite the lens opening 3, at which time the escapement 30 is oscillated about its pivot 37. The blade may then turn a short distance with the arms 31 and 32 riding on the smooth periphery 10 of the shutter blade so that as the shutter blade continues to move, the escapement is intermittently moved.

The construction above described is an advantage because it permits the spring 5 to be made of relatively heavy stock so that it will operate satisfactorily and insure the operation of the shutter blade each time the trigger 18 is depressed. The shutter may swing quickly to a position in which the escapement is oscillated, and then may swing quickly from that position to a closed position as indicated in Fig. 3, without further causing the escapement to oscillate. The escapement is oscillated twice as the shutter blade moves in one direction about its pivot, and these two movements are intermittent.

While I have shown my retarding device as being applied to a shutter in which the shutter blade is moved in one direction to make an exposure and in a reverse direction while the exposure aperture is covered up, it is obvious that an escapement can be applied directly to the periphery of a shutter blade which may make an exposure in each direction of movement about its pivotal support. I claim as within the scope of my invention all such forms as may come within the scope of the appended claims.

What I claim is:

1. In a photographic shutter, the combination with a support, of a blade pivotally mounted on said support and adapted to move through a path of movement thereon, means for moving the blade including a spring, a trigger for setting and releasing the spring to make an exposure, a plurality of spaced lugs carried by the blade, an escapement pivoted to the support and adapted to engage the lugs of and be driven intermittently in two directions by the shutter blade moving in one direction, whereby the speed of the shutter blade may be controlled.

2. In a photographic shutter, the combination with a support, of a blade pivotally mounted on said support and adapted to move through a path of movement thereon, means for moving the blade including a spring, a trigger for setting and releasing the spring to make an exposure, a plurality of spaced lugs carried by the blade, an escapement pivoted to the support and adapted to engage the lugs of and be driven back and forth in two directions by movement of the shutter blade in one direction, whereby the speed of the shutter blade may be controlled, the lugs on the shutter blade being positioned to control the movement of the blade only after it has moved a predetermined distance.

3. In a photographic shutter, the combination with a support, of a pivotally mounted blade adapted to move through a path of movement thereon, a spring for moving said blade, a trigger adapted to set and release the spring to cause the blade to move, said shutter blade including an exposure opening and a radial edge, lugs carried by the radial edge of the shutter blade in definite relation to the opening, an escapement pivoted to the support and including arms adapted to contact with the lugs and with the radial edge of the shutter blade, the relative position of the arms and lugs causing retardation of the shutter as the exposure opening becomes operative to make an exposure.

4. In a photographic shutter, the combination with a support, of a pivotally mounted blade adapted to move through a path of movement thereon, a spring for moving said blade, a trigger adapted to set and release the spring to cause the blade to move, said shutter blade including an exposure opening, two lugs carried by the shutter blade, a two-arm escapement pivoted to the support and adapted to be moved by the lugs on the shutter blade, one lug being arranged to engage an arm of the escapement as the exposure aperture reaches an operative position, the position of the two-arm escapement relative to the lugs being such that the shutter blade may move free from retarding action of the escapement while the exposure aperture is inoperative, and the shutter blade may be retarded by means of the escapement only after the shutter blade has moved a predetermined distance.

5. In a photographic shutter, the combination with a support including a pair of spaced studs, of a blade pivotally mounted on one of the shutter support studs for oscillation thereon, an escapement pivotally mounted on the other of the support studs for oscillation thereon, a spring directly engaging the shutter blade for turning the blade upon its pivotal support, a trigger adapted to set and release said spring for causing an exposure to be made, the blade including an arcuate surface having at least two lugs with tapering walls projecting from said arcuate surface and extending into the path of movement of the escapement, whereby the lugs may be engaged by the escapement to slow up the movement of the shutter blade after said blade has reached a predetermined position in its oscillatory movement.

6. In a photographic shutter, the combination with a support, of a single blade pivotally mounted upon the support, an escapement pivotally mounted upon said support in spaced relation to the pivotal support for the shutter blade, means for moving the shutter blade including a spring, a trigger adapted to set and release the spring for moving the shutter blade, means for transmitting movement from said shutter blade to said escapement comprising interengaging lugs on said shutter and said escapement so arranged that the movement of said shutter blade under the impulse of said spring may be retarded after a predetermined degree of movement, the walls of the lugs carried by the shutter blade being tapered with respect to the escapement and being positioned to oscillate the escapement as the shutter blade is moved.

WILLIAM A. RIDDELL.